(12) United States Patent
Richard et al.

(10) Patent No.: US 9,010,258 B1
(45) Date of Patent: Apr. 21, 2015

(54) SEED SINGULATOR SYSTEM

(71) Applicants: Leroy Richard, Kindred, ND (US); Joe Waldner, Clark, SD (US)

(72) Inventors: Leroy Richard, Kindred, ND (US); Joe Waldner, Clark, SD (US)

(73) Assignee: Leroy Richard, Kindred, ND (US)

( * ) Notice: Subject to any disclaimer, the term of this patent is extended or adjusted under 35 U.S.C. 154(b) by 129 days.

(21) Appl. No.: 13/748,056

(22) Filed: Jan. 23, 2013

(51) Int. Cl.
| | |
|---|---|
| A01C 7/04 | (2006.01) |
| A01C 7/12 | (2006.01) |
| A01C 7/20 | (2006.01) |
| A01C 7/08 | (2006.01) |

(52) U.S. Cl.
CPC . *A01C 7/046* (2013.01); *A01C 7/04* (2013.01); *A01C 7/044* (2013.01); *A01C 7/082* (2013.01); *A01C 7/125* (2013.01); *A01C 7/084* (2013.01); *A01C 7/127* (2013.01); *A01C 7/206* (2013.01)

(58) Field of Classification Search
CPC ............ A01C 7/00; A01C 7/04; A01C 7/042; A01C 7/044; A01C 7/046; A01C 7/08; A01C 7/081; A01C 7/082; A01C 7/083; A01C 7/10; A01C 7/11; A01C 7/123; A01C 7/124; A01C 7/125; A01C 7/126; A01C 7/127; A01C 7/128; A01C 7/14; A01C 7/16; A01C 7/20; A01C 7/206
USPC .................................... 111/177–185, 170, 14
See application file for complete search history.

(56) References Cited

PUBLICATIONS

Brochure, "Planting Equipment", John Deere, pp. 10-11, Planting Equipment Seed metering systems, pp. 14-15, Planting Equipment Central Commodity System, Oct. 2009.

*Primary Examiner* — Christopher J Novosad
(74) *Attorney, Agent, or Firm* — Jeffrey A. Proehl; Woods Fuller Shultz & Smith P.C.

(57) ABSTRACT

A seed singulator system for a seed planter may comprise a seed container including a housing defining an interior to hold seed. A seed pickup assembly may be configured to pick up seeds individually from the interior, and the pickup assembly defines a plurality of seed-retaining holes configured to hold seed when a vacuum is applied to the holes. A seed discharging assembly may be configured to discharge seed in a singular manner from the seed container. The seed discharge assembly may comprise a seed receiver structure configured to receive seeds from the seed pickup assembly, and may define a seed-receiving passage having an entry opening for a seed to pass through, with the seed-retaining holes being alignable with the entry opening. A seed ejecting structure may be configured to eject seeds one at a time from the seed pickup assembly into the entry opening of the seed receiver structure.

20 Claims, 7 Drawing Sheets

SEED SINGULATOR SYSTEM

BACKGROUND

Field

The present disclosure relates to planter seed metering systems and more particularly pertains to a new seed singulator system for a planter metering system that provides more consistent delivery of seed to the furrow in the ground.

SUMMARY

The present disclosure relates to a seed singulator system for a seed planter, and may comprise a seed container including a housing defining an interior configured to hold seed, and a seed pickup assembly configured to pick up seeds individually from the interior of the seed container. The seed pickup assembly may define a plurality of seed-retaining holes configured to hold seed when a vacuum is applied to the holes. The system may also comprise a seed discharging assembly configured to discharge seed in a singular manner from the seed container. The seed discharge assembly may comprise a seed receiver structure configured to receive seeds from the seed pickup assembly, and the seed receiver structure may define at least one seed-receiving passage with an entry opening for a seed to pass through. The seed-retaining holes are alignable with the entry opening. The seed discharge assembly may include a seed ejecting structure configured to eject seeds one at a time from the seed pickup assembly into the entry opening of the seed receiver structure.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
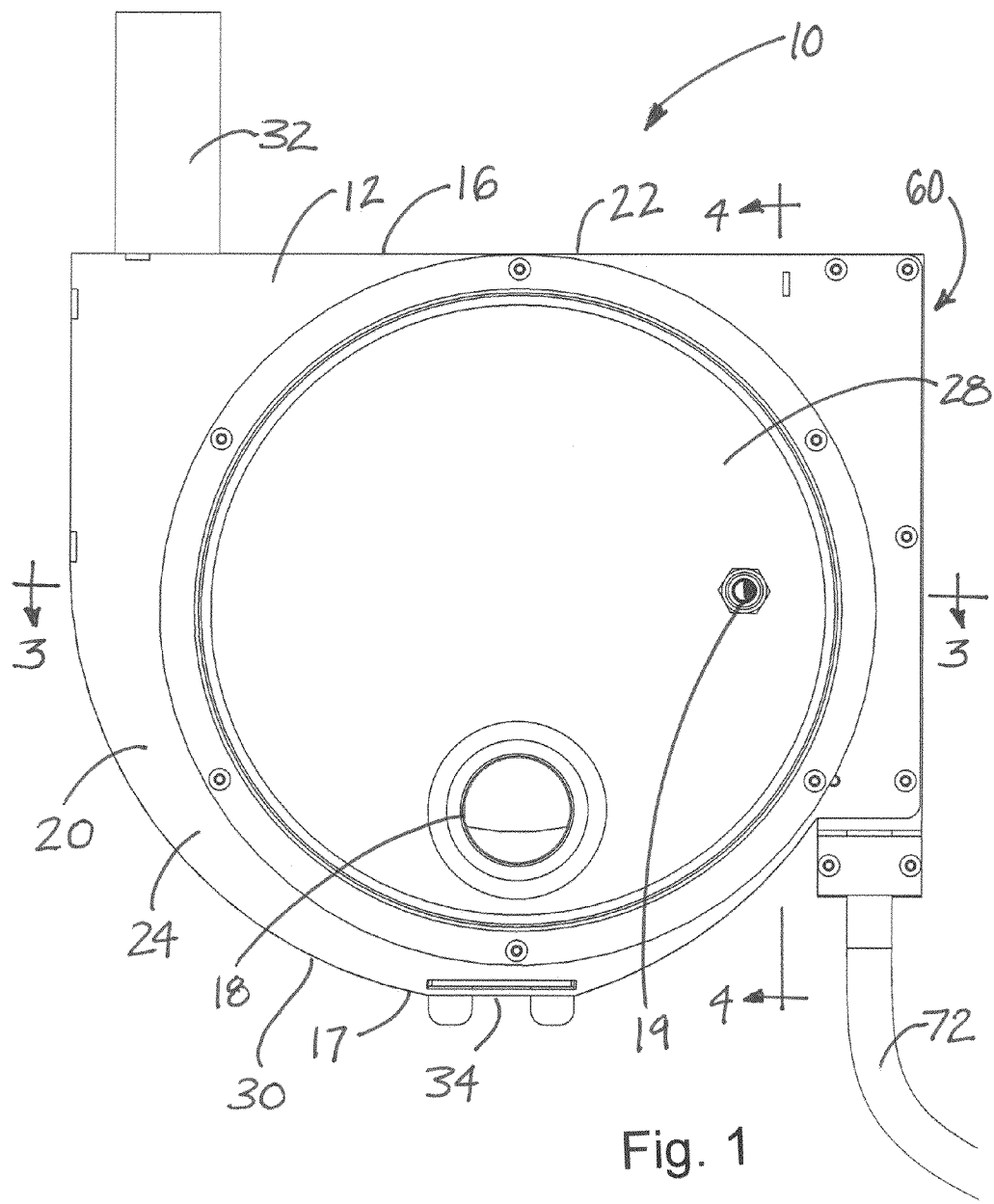
FIG. 1 is a schematic front view of a new seed singulator system according to the present disclosure.
Figure 2:
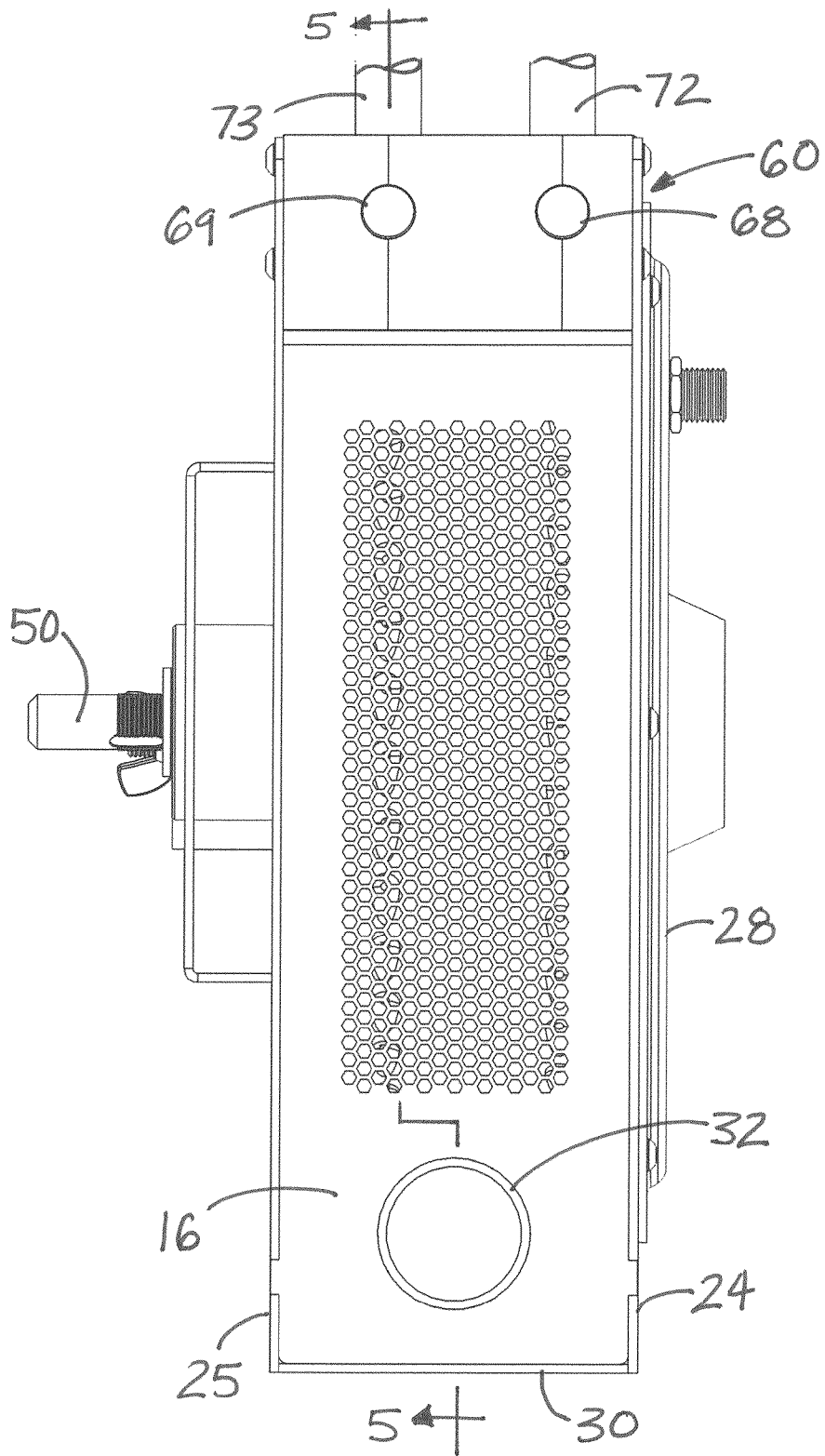
FIG. 2 is a schematic top view of the system according to an illustrative embodiment.
Figure 3:
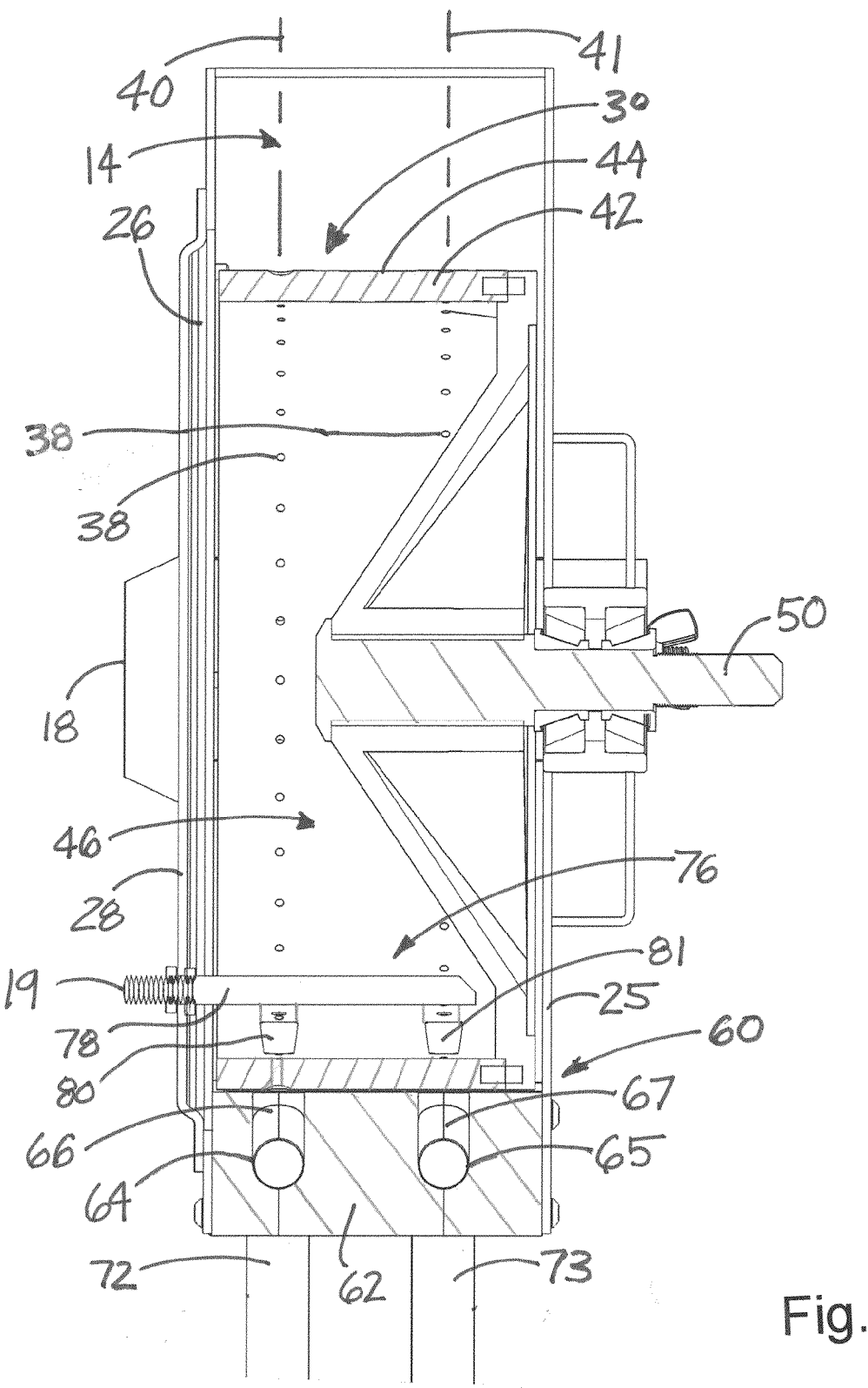
FIG. 3 is a schematic sectional view of the system taken along line 3-3 of FIG. 1, according to an illustrative embodiment.
Figure 4:
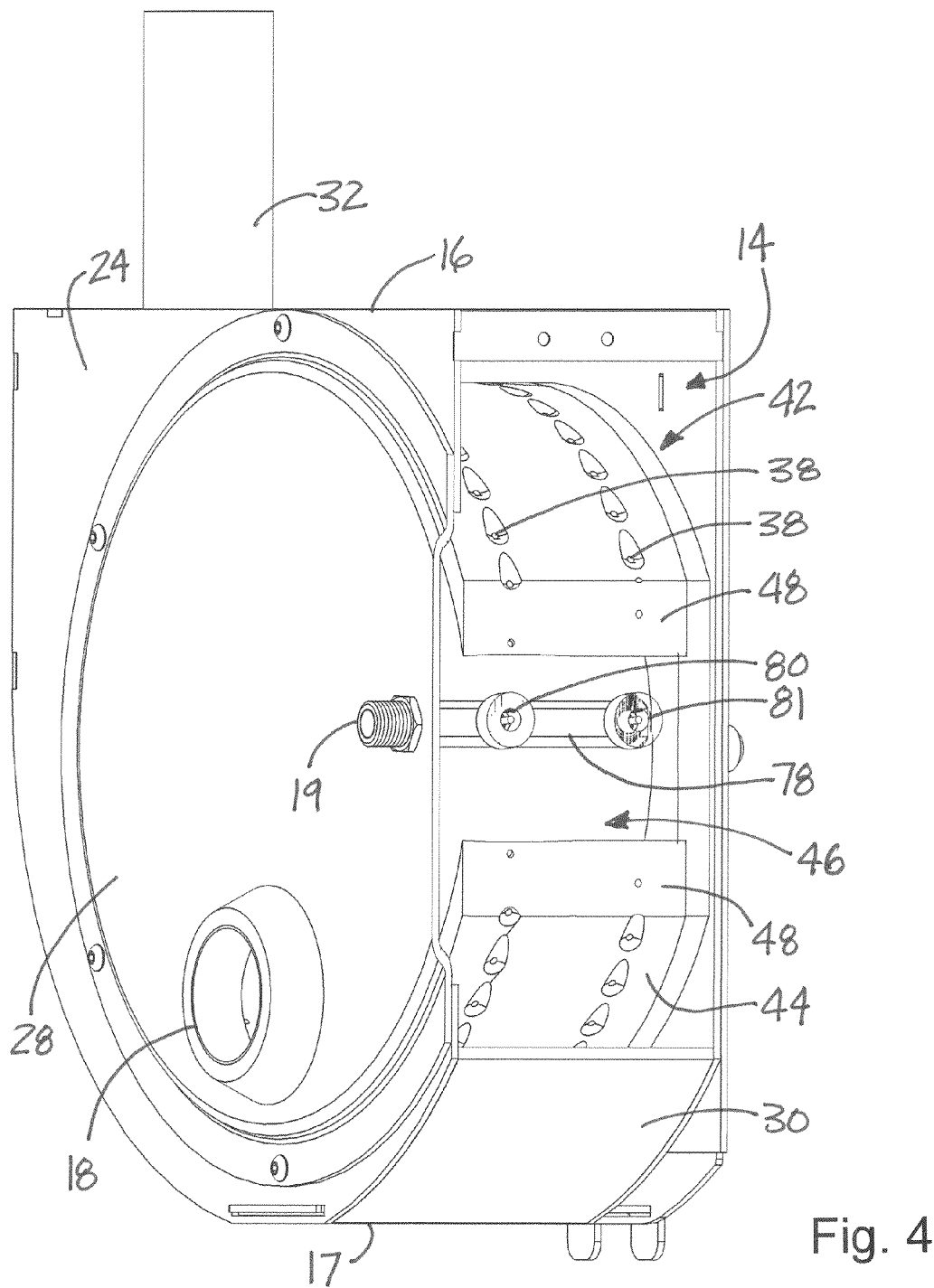
FIG. 4 is a schematic perspective sectional view of the system taken along line 4-4 of FIG. 1, according to an illustrative embodiment.
Figure 5:
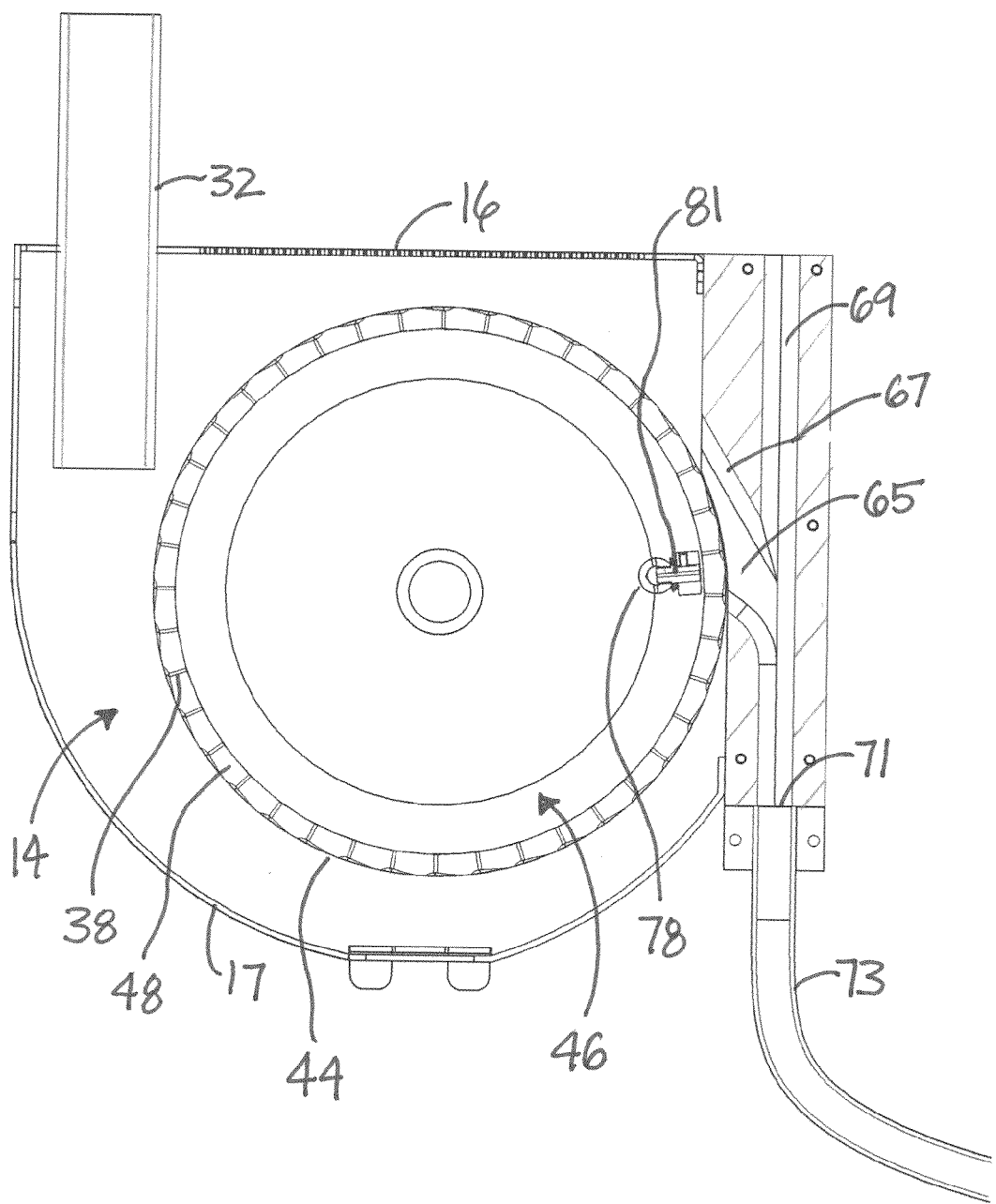
FIG. 5 is a schematic sectional view of the system taken along line 5-5 of FIG. 2, according to an illustrative embodiment.
Figure 6:
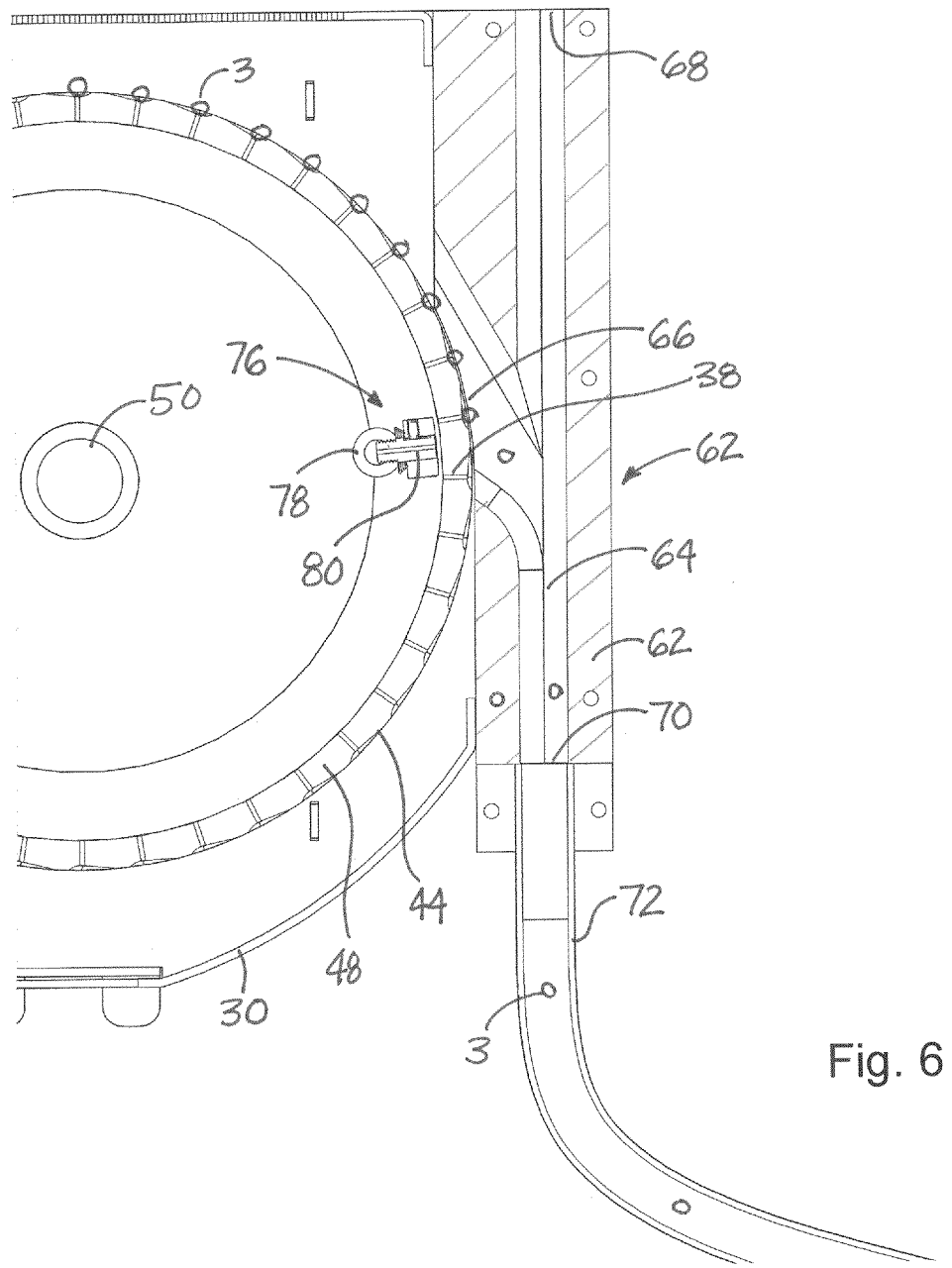
FIG. 6 is a schematic enlarged portion of the section of the system shown in FIG. 5, according to an illustrative embodiment.
Figure 7:
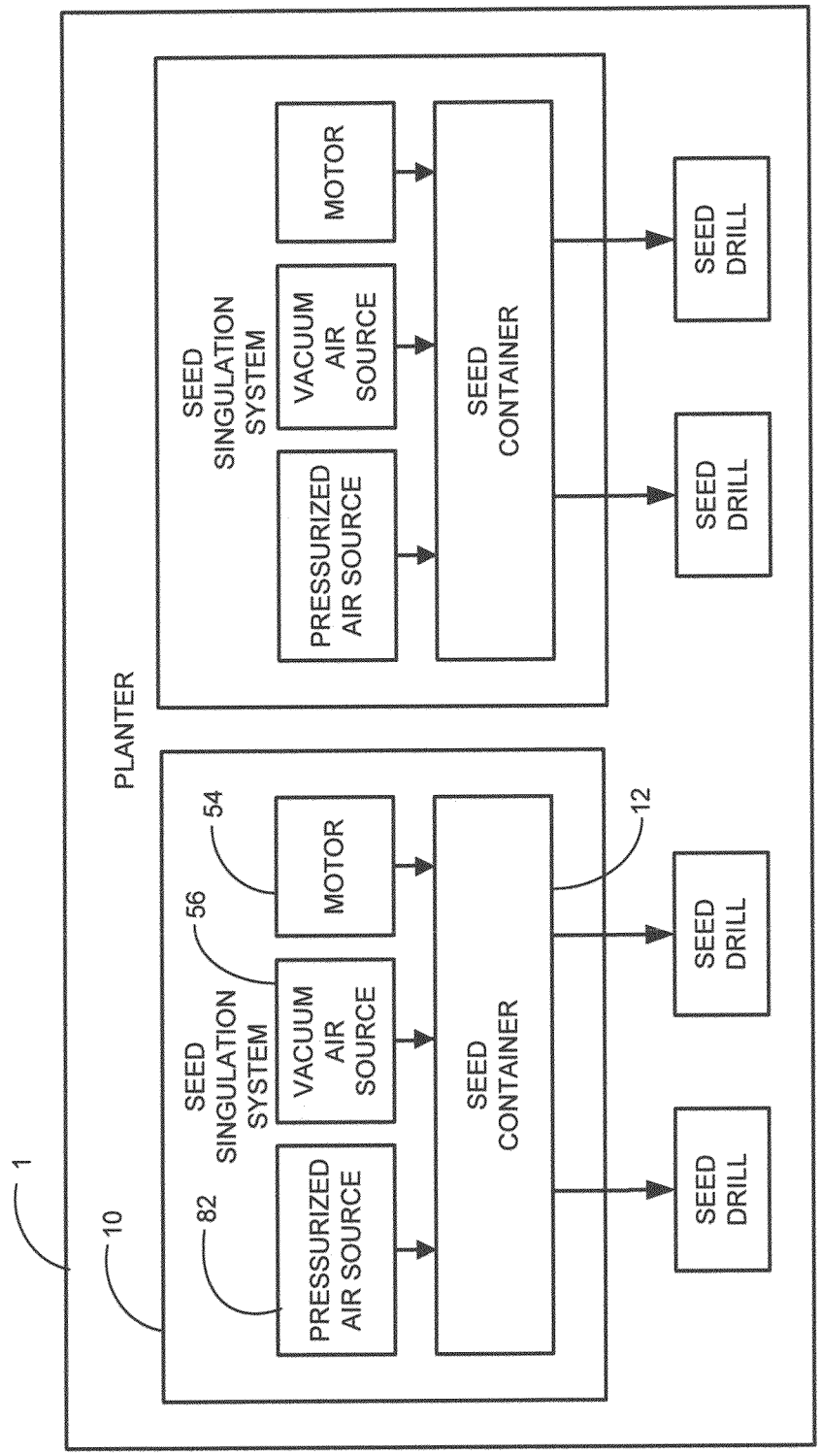
FIG. 7 is a schematic diagram of the seed singulator system on a planter, according to an illustrative embodiment.

With reference now to the drawings, and in particular to FIGS. 1 through 7 thereof, a new seed singulator system embodying the principles and concepts of the disclosed subject matter will be described.

Applicant has recognized that there is a problem with existing planter seed metering systems in that the rate at which a seed is dispensed by the existing systems is not reliably uniform, and can vary significantly in a manner that can significantly affect the spacing of seeds in a row in the field, which in turn can affect the crop yield from the field. The poor uniformity of the seed spacing in the row may be exacerbated by increasing the speed of the planter across the ground, as increased travel speed requires the metering device to dispense seeds at a faster rate. The non-uniformity inherent in the existing systems, and the degradation of the uniformity of the rate at higher speeds, has limited the speeds at which a planter may be towed across a field if accurate plant spacing is desired.

In greater detail, existing systems utilize a rotating disk with holes through the disk, and apply a vacuum condition to one side of the disk to hold seeds against the other side of the disk at each of the holes. The seed is released from the disk at one rotational position as a hole moves to the position, and the hole is blocked from being exposed to the vacuum condition. Released from the influence of the vacuum condition, the seed then falls into a funnel-shaped structure below the rotational position. Applicant has recognized that one likely cause of the non-uniformity of seed dispensing is that the seed does not come off of the rotating disk at a consistent location. For example, if the position of the vacuum release or blocking is at the three o'clock position of the rotating disk, the seed may actually leave the disk as "early" as the three o'clock position or as "late" as the six o'clock position (or any position in between). This variation leads to variations in the rate that the seeds leave the disk and enter the funnel of the metering system. Further, as the seeds tend to leave the disk at different locations in the rotation, some seeds may enter the funnel in a direct line that minimizes any bounce of the seed in the funnel and as a result minimizes the time spent in the funnel, while other seeds take a path that causes them to strike the sides of the funnel and bounce around inside the funnel which increases the time spent in the funnel before leaving the funnel. Increasing the ground speed of the planter requires faster rotation of the disk, and this may only exacerbate the variation in the seed release position as well as the time spent in the funnel.

Applicant has further recognized that the passive release of the seed by simply blocking the vacuum applied to the disk in the existing meters contributes to the seed being able to leave the disk at a variety of locations, and that an active release, or ejection, of the seed from the rotating element would minimize any variation in the location of the release of the seed from the rotating element, and thus cause the seeds to take a more uniform path from the disk. Further, the more uniform seed path resulting from the active ejection of the seed from the disk permits the use of a smaller structure for catching the ejected seed, which further minimizes any bouncing or deflection of the seed in the structure that may introduce delays and variations in the seed movement.

The seed singulator system 10 of the disclosure thus provides advantages over known seed metering systems used on existing planter. The system 10 may be implemented on various types of seed planters which will not be further discussed in detail here.

The seed singulator system 10 may include a seed container 12 that defines an interior 14 which is configured to hold a quantity of seed 3 to be planted by the planter 1. The seed container may have a top 16 and a bottom 17, with the container 12 oriented such that seed in the interior fills the interior from the bottom toward the top. The seed container may have a vacuum application port 18 and a pressure application port 19 which will be described in greater detail below.

The seed container 12 may comprise a housing 20 that generally encloses and defines the interior 14 of the seed container. Illustratively, the housing 20 may include an upper wall 22, and a pair of side walls 24, 25, located on opposite sides of the interior of the housing. One of the side walls may have an access aperture 26 formed therein, and a cover 28 being removably positioned over the access aperture. In some embodiments, the vacuum application port 18 is located on the cover, although this is not critical. The housing may further include a perimeter wall 30 that extends between the side walls 24, 25. The seed container may also include a seed feed tube 32 for receiving seed to fill the interior 14 of the seed container. The seed feed tube 32 may be positioned toward the top of the seed container, and may be located in the upper wall of the housing. The seed feed tube 32 have a lumen in communication with the interior 14 of the seed container so that seed in the tube 32 enters the interior. The seed container 12 may also include a drain door 34 positioned toward the bottom of the seed container to release seed from the interior of the seed container. The drain door 34 may be movable between a closed position in which the seed is retained in the interior, and an open position in which the seed is released and may flow out of the interior 14 under the influence of gravity. The drain door 34 may be securable in the closed position.

The system 10 may also include a seed pickup assembly 36, which may be configured to generally pick up individual seeds positioned in the interior 14 of the seed container. At least a portion of the seed pickup assembly 36 may be positioned in the interior 14 and may be positioned so at least a portion of the assembly is in contact with seed in the interior 14. The seed pickup assembly 36 may define a plurality of seed-retaining holes 38 that each function to pick up and hold an individual seed taken from the interior 14 of the seed container when a vacuum is applied to the holes 38 by means described below. The seed-retaining holes 38 may be positioned in a first plane 40. In some embodiments, a first portion of the seed-retaining holes 38 are positioned in the first plane 40 and a second portion of the seed retaining holes are positioned in a second plane 41. The second plane 41 may be oriented substantially parallel to the first plane 40, and the planes are spaced from each other. In general, the size of the holes is selected to be smaller than the individual seeds so that the seeds are unable to pass through the holes. In some embodiments, the holes 38 may be associated with an indentation or recess about the hole to accommodate some portion of the volume of the seed retained by the hole, but this is not critical to the operation of the system 10.

In greater detail, the illustrative seed pickup assembly 36 may comprise a rotatable drum 42 that has an outer circumferential surface 44 that is movable proximate to seed in the interior 14 of the seed container. The seed-retaining holes 38 may be formed on the outer circumferential surface 44 of the drum 42, and may be substantially uniformly spaced along the surface 44. The planes 40, 41 of the holes 38 may be oriented substantially perpendicular to the axis of rotation of the drum, so that the holes extend along circumferential lines about the rotational axis. The drum 42 may have a drum interior 46, and the drum may be configured and structured to maintain a vacuum condition when a vacuum is applied to the interior. The seed-retaining holes 38 may be in communication with the drum interior 46, and the drum interior may be in communication with the vacuum application port 18 such that a vacuum applied to the vacuum application port is applied to the seed-retaining holes 38 to draw seeds in the interior 14 of the seed container toward the holes and are held against the outer circumferential surface 44 by the vacuum. Since each of the holes 38 is smaller than the seed, the vacuum applied at each hole is only able to hold a single seed against the surface 44. It will be recognized that, but for the presence of the seeds held against and blocking the holes 38, the vacuum condition is also applied to the interior 14 of the seed container outside of the drum 42 through the holes.

The rotatable drum 42 may comprise a circumferential drum wall 48 that forms the outer circumferential surface 44 of the drum 42, and the seed-retaining holes 38 extend through the drum wall 48. The rotatable drum 42 may also comprise an axle 50 that is connected to the circumferential drum wall 48 such that rotation of the axle 50 causes rotation of the drum wall 48. The rotatable drum 42 may also include structure that links the drum axle 50 to the wall 48, and in some embodiments a plurality of spokes 52 may radiate outwardly from the axle to the wall 48.

The seed pickup assembly 36 may also comprise a motor 54 that is configured to rotate the drum, such as through connection to the axle 50 of the drum. The seed pickup assembly 36 may also comprise a vacuum source 56 that is in communication with the vacuum application port 18, but it should be understood that the location of the source of the vacuum is not critical to the operation of the system. It should also be recognized that the use of the term "vacuum" in this description is in relative terms, and is intended to include conditions in which the pressure of air in the space subject to the vacuum (such as the interior of the drum) is relatively less than the pressure of air that is not subject to the vacuum (such as the interior of the seed container, or the atmosphere outside the seed container). Thus, the areas or spaces subject to the vacuum may only be subject to a relatively low air pressure condition, and not the absence of air.

The system 10 may also include a seed discharging assembly 60 that is configured and functions to discharge seed in a singular manner from the system 10. The seed discharge assembly may include a seed receiver structure 62 that is configured to receive seeds from the seed pickup assembly. The seed receiver structure 62 may be positioned adjacent to the outer circumferential surface 44 of the rotatable drum.

The seed receiver structure 62 may define at least one seed-receiving passage 64 through which the seed is moved away from the seed pickup assembly toward the furrow in the ground where the seed is to be planted. The seed-receiving passage 64 has an entry opening 66 for a seed to pass through into the main portion of the passage. The seed-retaining holes 38 may be alignable with the entry opening 66 for receiving seeds associated with the holes in the first plane 40. The entry opening 66 may be located in the first plane of the seed-retaining holes, and the entry opening 66 may be elongated in shape, with the elongation being in the first plane. The seed receiver structure 62 may include a second seed-receiving passage 65 with a second entry opening 67, and the second entry opening 67 may be alignable with the holes of the portion of seed receiving holes that are located in the second plane 41 to receive seeds associated with the holes in the second plane.

The seed-receiver structure 62 may also include an air flow port 68 for receiving pressurized air, or at least a flow of air through moves into the port 68. The air flow port 68 is in communication with the seed receiving passage 64 to create a flow of air through the seed-receiving passage. The seed-receiving passage 64 also has a seed outlet 70. The seed-receiver structure 62 may also include a second air flow port 69 for receiving pressurized air therethrough, and the second air flow port may be in communication with the second seed receiving passage 65 to create a flow of air through the second passage 65. The second seed-receiving passage 65 may also have a second seed outlet 71.

The seed discharging assembly 60 may further include a seed outlet tube 72 in communication with the seed outlet 70 and the seed-receiving passage 64, and also a second seed outlet tube in communication with the second seed outlet 71 and the second seed-receiving passage 65.

One significant feature that the seed discharging assembly 60 may include is a seed ejecting structure 76 that is configured to eject seeds one at a time into the seed receiver structure 62, and in most embodiments does so in an active manner rather than a passive manner. The seed ejecting structure 76 may force air through, or allow pressurized air to pass into, one of the seed-retaining holes 38 when the hole 38 is moved into alignment with the entry opening 66 of the seed receiver structure 62. To provide the air that forces the seed from the hole 38, the seed ejecting structure 76 may be in fluid communication with the pressure application port 19.

The seed ejecting structure 76 may comprise a nozzle tube 78 positioned in the drum interior 46 adjacent to the circumferential drum wall 48 and opposite of the seed receiver structure 62 positioned outside of the drum interior. The nozzle tube 78 may include a nozzle aperture 80 alignable with at least one of the seed-retaining holes 38, and the nozzle aperture 80 may be alignable with each of the seed-retaining holes in the first plane 40 individually as the rotatable drum 42 is rotated to move each of the holes 38 into registry with the nozzle aperture 80. In the illustrative embodiments, the nozzle tube 78 has a pair of the nozzle apertures, with a first nozzle aperture 80 being alignable with one of the seed-retaining holes in the first plane 40 and a second nozzle aperture 81 being alignable with one of the seed-retaining holes in the second plane 41. The nozzle tube 78 may have an interior that is in fluid communication with each of the nozzle apertures 80, 81 and the pressure application port 19.

Further, the seed ejecting structure 76 may comprise a pressurized air source 82 that is in communication with the pressure application port 19 on the seed container. The pressurized air source 82 may be in communication with the air flow port 68 and the second air flow port 69.

The rotation of the drum 42, and the resulting alignment of the nozzle apertures 80, 81 with a hole 38 of the drum wall 48, allows the pressurized air to enter the hole and causes any seed held against the hole by the vacuum condition in the drum interior 46 to be released. Thus, not only does the seed ejecting structure 76 function to block the hole from the influence of the vacuum to which the other holes remain exposed, the structure 76 additionally supplies pressurized air to the hole which forcefully ejects the seed from the hole without mechanical force being applied to the seed.

The speed or rate at which the seed is ejected from the seed singulator is a function of the speed of rotation of the drum 42, which in many embodiments is a function of the speed of rotation of the motor 54. The application of the vacuum to the drum interior 46, and the application of the pressurized air to the seed ejecting structure 76, is uniform and the ejection of the seed does not depend upon any variation in the vacuum or the pressure to time the ejection of the seed.

In some embodiments, the seed-retaining holes 38 in the first plane 40 and the seed-retaining holes in the second plane 41 are circumferentially offset from each other so that a seed is not ejected from the holes of the first plane and from the holes of the second plane at the same time, although simultaneous or substantially simultaneous ejection of the seeds from holes in the first and second planes is possible.

With the inclusion of two (or more) sets of holes, seed receiving passages, entry openings, and seed outlet tubes, two or more planter assemblies (e.g., such as a seed drill) may be supplied by one seed singulator system 10 of the disclosure.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A seed singulator system for a seed planter, comprising:
a seed container including a housing defining an interior configured to hold seed;
a seed pickup assembly configured to pick up seeds individually from the interior of the seed container, the seed pickup assembly defining a plurality of seed-retaining holes configured to hold seed when a vacuum is applied to the holes;
a seed discharging assembly configured to discharge seed in a singular manner from the seed container, the seed discharge assembly comprising:
 a seed receiver structure configured to receive seeds from the seed pickup assembly, the seed receiver structure defining at least one seed-receiving passage with an entry opening for a seed to pass through, the seed-retaining holes being alignable with the entry opening; and a seed ejecting structure configured to eject seeds one at a time from the seed pickup assembly into the entry opening of the seed receiver structure.

2. The system of claim 1 wherein the seed ejecting structure forces air through one of the seed-retaining holes of the seed pickup assembly when the hole is aligned with the entry opening of the seed receiver structure.

3. The system of claim 1 wherein the seed ejecting structure comprises a nozzle tube having a nozzle aperture alignable with at least one of the seed-retaining holes of the seed pickup assembly to permit pressurized air in the nozzle tube to pass through the aligned seed-retaining hole.

4. The system of claim 3 wherein the seed pickup assembly is movable with respect to the seed ejecting structure such that the nozzle aperture is alignable with each of the seed-retaining holes individually.

5. The system of claim 4 wherein a portion of the seed-retaining holes are positioned in a first plane and a portion of the holes are positioned in a second plane, and the nozzle tube has a pair of the nozzle apertures with a first nozzle aperture being alignable with seed-retaining holes in the first plane and a second nozzle aperture being alignable with seed-retaining holes in the second plane.

6. The system of claim 3 wherein the seed discharging assembly includes a pressurized air source in fluid communication with the nozzle tube and the nozzle aperture on the tube.

7. The system of claim 1 wherein a portion of the seed-retaining holes are positioned in a first plane and a portion of the holes are positioned in a second plane.

8. The system of claim 7 wherein the entry opening is positioned in the first plane of seed-retaining holes for receiving seeds ejected from the seed-retaining holes in the first plane, and the seed receiver structure including a second seed-receiving passage with a second entry opening is positioned in the second plane of seed-retaining holes for receiving seeds ejected from the seed-retaining holes in the second plane.

9. The system of claim 1 wherein the seed pickup assembly comprises a rotatable drum having an outer circumferential surface movable proximate to seed in the interior of the seed container, the seed-retaining holes being formed on the outer circumferential surface of the drum.

10. The system of claim 9 wherein the seed-retaining holes are substantially uniformly spaced along the outer circumferential surface.

11. The system of claim 9 wherein the seed-retaining holes are positioned in a plane oriented substantially perpendicular to an axis of rotation of the rotatable drum.

12. The system of claim 9 wherein the drum has circumferential drum wall defining a drum interior, and the seed-retaining holes pass through the drum wall such that a vacuum applied to the drum interior is applied to the seed-retaining holes and seeds in the interior of the seed container are drawn to the holes on the outer circumferential surface.

13. The system of claim 9 wherein the seed receiver structure is positioned adjacent to the outer circumferential surface of the rotatable drum such that a seed ejected from the outer circumferential surface enters the entry opening on the seed receiving structure.

14. The system of claim 1 wherein the seed-receiver structure includes an air flow port for receiving pressurized air, the air flow port being in communication with the seed receiving passage to induce a flow of air through the seed-receiving passage.

15. The system of claim 14 wherein the seed-receiver structure includes a second air flow port for receiving pressurized air, the second air flow port being in communication with a second seed receiving passage in the seed receiving structure to induce a flow of air through the second seed-receiving passage.

16. The system of claim 1 wherein the seed ejecting structure forces air through one of the seed-retaining holes of the seed pickup assembly when the hole is aligned with the entry opening of the seed receiver structure;

wherein the seed ejecting structure comprises a nozzle tube having a nozzle aperture alignable with at least one of the seed-retaining holes of the seed pickup assembly to permit pressurized air in the nozzle tube to pass through the aligned seed-retaining hole;

wherein the seed pickup assembly is movable with respect to the seed ejecting structure such that the nozzle aperture is alignable with each of the seed-retaining holes individually;

wherein a portion of the seed-retaining holes are positioned in a first plane and a portion of the holes are positioned in a second plane;

wherein the nozzle tube has a pair of the nozzle apertures with a first nozzle aperture being alignable with seed-retaining holes in the first plane and a second nozzle aperture being alignable with seed-retaining holes in the second plane;

wherein the seed pickup assembly comprises a rotatable drum having an outer circumferential surface movable proximate to seed in the interior of the seed container, the seed-retaining holes being formed on the outer circumferential surface of the drum;

wherein the seed-retaining holes are substantially uniformly spaced along the outer circumferential surface;

wherein the first and second planes are each oriented substantially perpendicular to an axis of rotation of the rotatable drum;

wherein the drum has circumferential drum wall defining a drum interior, and the seed-retaining holes pass through the drum wall such that a vacuum applied to the drum interior is applied to the seed-retaining holes and seeds in the interior of the seed container are drawn to the holes on the outer circumferential surface;

wherein the seed receiver structure is positioned adjacent to the outer circumferential surface of the rotatable drum such that a seed ejected from the outer circumferential surface enters the entry opening on the seed receiving structure;

wherein the entry opening is positioned in the first plane of seed-retaining holes for receiving seeds ejected from the seed-retaining holes in the first plane, and the seed receiver structure including a second seed-receiving passage with a second entry opening is positioned in the second plane of seed-retaining holes for receiving seeds ejected from the seed-retaining holes in the second plane;

wherein the seed-receiver structure includes an air flow port for receiving pressurized air, the air flow port being in communication with the seed receiving passage to induce a flow of air through the seed-receiving passage, and the seed-receiver structure includes a second air flow port for receiving pressurized air, the second air flow port being in communication with the second seed receiving passage in the seed receiving structure to induce a flow of air through the second seed-receiving passage.

17. The system of claim 1 wherein the seed ejecting structure is configured to force air radially outward with respect to the seed receiver structure through one of the seed-retaining holes at a time.

18. A seed singulator system for a seed planter, comprising:
a seed container including a housing defining an interior configured to hold seed;
a seed pickup assembly configured to pick up seeds individually from the interior of the seed container, the seed pickup assembly defining a plurality of seed-retaining holes configured to hold seed when a vacuum is applied to the holes;
a seed discharging assembly configured to discharge seed in a singular manner from the seed container, the seed discharge assembly comprising:
a seed receiver structure configured to receive seeds from the seed pickup assembly, the seed receiver structure defining at least one seed-receiving passage with an entry opening for a seed to pass through, the seed-retaining holes of the pickup assembly being alignable with the entry opening; and
a seed ejecting structure configured to force air through one of the seed-retaining holes of the seed pickup assembly when the hole is aligned with the entry opening of the seed receiver structure and thereby eject a seed outwardly from the seed pickup assembly into the entry opening of the seed receiver structure the seed pickup assembly being movable with respect to the seed ejecting structure such that the nozzle aperture is alignable with each of the seed-retaining holes individually.

19. The system of claim 18 wherein the seed ejecting structure comprises a nozzle tube in communication with a pressurized air source, the nozzle tube having a nozzle aperture through which the pressurized air is forced, the nozzle aperture being alignable with at least one of the seed-retaining holes of the seed pickup assembly to force pressurized air in the nozzle tube through the aligned seed-retaining hole and eject a seed adjacent to the hole from the seed pickup assembly.

20. The system of claim 18 wherein the seed pickup assembly comprises a rotatable drum having an outer circumferential surface movable proximate to seed in the interior of the seed container, the drum having a circumferential drum wall defining a drum interior, the seed-retaining holes extending through the drum wall such that a vacuum applied to the drum interior is present at the seed-retaining holes at the outer circumferential surface such that seeds in the interior of the seed container are drawn to the holes on the outer circumferential surface.

* * * * *